US012070844B2

(12) United States Patent
Kaneko et al.

(10) Patent No.: US 12,070,844 B2
(45) Date of Patent: Aug. 27, 2024

(54) HYDRAULIC HAMMERING DEVICE

(71) Applicant: Furukawa Rock Drill Co., Ltd., Tokyo (JP)

(72) Inventors: Tsutomu Kaneko, Takasaki (JP); Susumu Murakami, Takasaki (JP); Isao Kobayashi, Takasaki (JP); Atsushi Shioda, Takasaki (JP); Shinsuke Nagano, Takasaki (JP)

(73) Assignee: Furukawa Rock Drill Co., Ltd., Tokyo (JP)

( * ) Notice: Subject to any disclaimer, the term of this patent is extended or adjusted under 35 U.S.C. 154(b) by 0 days.

(21) Appl. No.: 17/521,044

(22) Filed: Nov. 8, 2021

(65) Prior Publication Data

US 2022/0055196 A1 Feb. 24, 2022

Related U.S. Application Data

(62) Division of application No. 16/633,553, filed as application No. PCT/JP2018/027543 on Jul. 23, 2018, now Pat. No. 11,590,642.

(30) Foreign Application Priority Data

Jul. 24, 2017 (JP) ................................ 2017-142789

(51) Int. Cl.
*B25D 9/04* (2006.01)
*B25D 9/18* (2006.01)
*B25D 9/26* (2006.01)

(52) U.S. Cl.
CPC ................ *B25D 9/04* (2013.01); *B25D 9/18* (2013.01); *B25D 9/26* (2013.01); *B25D 2250/131* (2013.01)

(58) Field of Classification Search
CPC ... B25D 9/04; B25D 9/18; B25D 9/26; B25D 9/145; B25D 2250/131; B25D 9/00–265
(Continued)

(56) References Cited

U.S. PATENT DOCUMENTS 3,759,335 A * 9/1973 Coyne .................... E21B 4/145 173/91
3,774,502 A * 11/1973 Arndt ........................ F03C 1/14 91/321
(Continued)

FOREIGN PATENT DOCUMENTS

CN 1502436 A 6/2004
CN 105507318 A 4/2016
(Continued)

OTHER PUBLICATIONS

English translation of the International Preliminary Report on Patentability in related International Patent Application No. PCT/JP2018/027543, mailed Feb. 6, 2020, 6 pgs.
(Continued)

*Primary Examiner* — Dariush Seif
(74) *Attorney, Agent, or Firm* — Young Basile Hanlon & MacFarlane, P.C.

(57) ABSTRACT

A hydraulic hammering device enables an auto-stroke mode and an idle strike prevention mode to coexist with a simple circuit configuration. The device includes a first control valve to control advancing and retracting movements of a piston, an auto-stroke mode and an idle strike prevention mode, and a second control valve to select either of the auto-stroke mode or the idle strike prevention mode. To the second control valve, a shared spool is slidably fitted and a mode selection means is disposed. When the mode selection means allows supply of pressurized oil to an auto-stroke setting portion of the shared spool and prohibits discharge of pressurized oil from an idle strike prevention setting portion,
(Continued)

the auto-stroke mode is selected. When prohibiting supply of pressurized oil to the auto-stroke setting portion and allowing discharge of pressurized oil from the idle strike prevention setting portion, the idle strike prevention mode is selected.

11 Claims, 8 Drawing Sheets

(58) Field of Classification Search
USPC .......................................................... 173/200
See application file for complete search history.

(56) References Cited

U.S. PATENT DOCUMENTS 3,827,507 A * 8/1974 Lance .................... B25D 9/145 173/15
3,887,019 A * 6/1975 Reynolds ................. B25D 9/12 91/395
3,916,764 A * 11/1975 Crover ..................... B25D 9/12 91/335
3,971,448 A * 7/1976 Crover ..................... B25D 9/18 173/208
4,207,801 A * 6/1980 Reynolds ............... B25D 9/145 92/108
4,291,771 A * 9/1981 Perraud .................... B25D 9/12 173/DIG. 4
4,342,255 A * 8/1982 Watanabe ............... B06B 1/183 91/40
4,347,869 A * 9/1982 Strobel ..................... F23N 3/02 91/363 R
4,354,797 A * 10/1982 Hirose .................... E02F 3/437 414/700
4,460,051 A * 7/1984 Widmer ................. B25D 17/24 173/208
4,474,248 A * 10/1984 Musso ..................... B25D 9/12 173/208
4,524,582 A * 6/1985 Lucas ..................... B30B 15/16 91/20
4,527,959 A * 7/1985 Whiteman .............. F04B 9/113 417/427
4,646,854 A * 3/1987 Arndt ..................... B25D 9/145 91/321
4,784,228 A * 11/1988 Ito .......................... B25D 9/145 173/208
4,800,797 A * 1/1989 Comarmond .......... B25D 9/145 91/308
4,817,737 A * 4/1989 Hamada ................... B25D 9/12 91/277
4,838,363 A * 6/1989 MacOnochie ........... B28D 1/26 173/210
4,858,702 A * 8/1989 Piras ...................... B25D 9/145 173/208
4,899,836 A 2/1990 Vernot
5,060,734 A * 10/1991 Anderson .............. B25D 9/145 91/170 R
5,134,989 A 8/1992 Akahane
5,279,122 A * 1/1994 Shirai ................... E02F 9/2296 91/531
5,392,865 A * 2/1995 Piras ...................... B25D 9/145 173/208
5,626,068 A * 5/1997 Davies ................... B25D 9/145 91/300
5,653,295 A * 8/1997 Juvonen ................... B25D 9/26 173/208
5,669,281 A * 9/1997 Comarmond ............ B25D 9/26 91/278
5,718,297 A * 2/1998 Weber .................... B25D 9/145 173/208
5,836,400 A * 11/1998 Tupper .................. F15B 11/024 173/208
5,884,713 A * 3/1999 Shinohara .............. B25D 9/145 91/290
5,890,548 A * 4/1999 Juvonen ................... B25D 9/26 173/208
5,979,291 A 11/1999 Juvonen
6,029,753 A * 2/2000 Kuusento ............... B25D 17/06 173/206
6,073,706 A * 6/2000 Niemi ...................... B25D 9/18 173/208
6,491,114 B1 * 12/2002 Webel ................... E02F 9/2225 173/4
7,040,215 B2 * 5/2006 Bruck ................... F15B 11/003 91/DIG. 2
7,174,824 B2 * 2/2007 Koskimaki ............. B25D 9/20 91/218
7,484,570 B2 * 2/2009 Andersson ............... B25D 9/20 91/239
7,896,100 B2 * 3/2011 Andersson ................ E21B 1/30 173/90
8,151,900 B2 4/2012 Piras
8,151,901 B2 4/2012 Keskiniva et al.
8,640,787 B2 * 2/2014 Rohrer ...................... E02D 7/10 173/114
9,157,253 B2 * 10/2015 Rohrer, Jr. .............. F15B 21/12
9,701,003 B2 * 7/2017 Moore ..................... B25D 9/18
9,803,388 B2 * 10/2017 Cunningham ........ E04H 17/263
9,840,000 B2 * 12/2017 Juvonen ................... B25D 9/26
9,981,370 B2 * 5/2018 Kela ...................... B25D 9/145
9,981,371 B2 * 5/2018 Comarmond ............ B25D 9/18
10,022,850 B2 * 7/2018 Lee ........................ B25D 9/265
10,052,746 B2 * 8/2018 Autschbach ........... B25D 9/145
10,112,290 B2 * 10/2018 Autschbach ............. B25D 9/12
10,150,209 B2 * 12/2018 Matsuda .................. B25D 9/20
10,189,153 B2 * 1/2019 Frank ...................... E02F 9/265
10,207,379 B2 * 2/2019 Angel .................. B23Q 1/0009
10,245,714 B2 * 4/2019 Moore ..................... B25D 9/12
10,472,797 B2 * 11/2019 Park ...................... E02F 9/2225
10,562,165 B2 * 2/2020 Moore .................... F16K 17/04
10,801,184 B2 * 10/2020 Joo .......................... B25D 9/26
10,857,658 B2 * 12/2020 Joo .......................... B25D 9/26
10,974,379 B2 * 4/2021 Piras ........................ B25D 9/18
11,072,977 B2 * 7/2021 Koizumi ................... E21B 1/00
2001/0022229 A1 9/2001 Deimel et al.
2002/0185285 A1 * 12/2002 Ahr ........................ B25D 9/265 173/206
2006/0032649 A1 * 2/2006 Keskiniva ................ B25D 9/22 173/213
2008/0135270 A1 * 6/2008 Henriksson .............. B25D 9/20 173/207
2008/0296035 A1 12/2008 Lohmann et al.
2009/0090525 A1 * 4/2009 Juvonen ................ F16K 17/082 173/1
2009/0250234 A1 * 10/2009 Piras ........................ B25D 9/18 173/207
2009/0321100 A1 * 12/2009 Andersson ................ E21B 1/02 173/206
2011/0000695 A1 1/2011 Saf
2011/0155403 A1 6/2011 Rohrer
2012/0138328 A1 6/2012 Teipel et al.
2012/0160528 A1 * 6/2012 Theobalds ............ F15B 13/024 173/90
2014/0090552 A1 4/2014 Hogan et al.
2014/0326473 A1 * 11/2014 Comarmond ............ B25D 9/26 173/1
2015/0273676 A1 * 10/2015 Spektor .................... B25D 9/08 173/132
2015/0375382 A1 * 12/2015 Autschbach ............. B25D 9/12 173/20
2015/0375383 A1 * 12/2015 Autschbach ........... B25D 9/145 173/20
2016/0053908 A1 * 2/2016 Hämäläinen .............. E21B 4/14 251/12
2016/0138728 A1 * 5/2016 Hämäläinen .............. E21B 1/38 251/12
2016/0199969 A1 7/2016 Moore
2016/0279775 A1 9/2016 Lee et al.
2017/0001293 A1 1/2017 Matsuda et al.

(56) References Cited

U.S. PATENT DOCUMENTS

| | | | | |
|---|---|---|---|---|
| 2017/0030182 | A1 | 2/2017 | Patterson | |
| 2017/0259421 | A1* | 9/2017 | Grzybowski | B25D 9/26 |
| 2018/0163366 | A1* | 6/2018 | Park | E02F 3/966 |
| 2018/0207782 | A1* | 7/2018 | Koizumi | B25D 9/26 |
| 2020/0181978 | A1* | 6/2020 | Koizumi | B25D 9/26 |

FOREIGN PATENT DOCUMENTS

| | | | | | |
|---|---|---|---|---|---|
| CN | 105829631 | A | | 8/2016 | |
| EP | 0122247 | B1 | | 7/1987 | |
| GB | 1391796 | A | | 4/1975 | |
| JP | H04300172 | A | * | 3/1991 | B25D 17/10 |
| JP | H04-300172 | A | | 10/1992 | |
| JP | H09-076172 | A | | 3/1997 | |
| JP | H10-080878 | A | | 3/1998 | |
| JP | 2001-315074 | A | | 11/2001 | |
| JP | 2003-159667 | A | | 6/2003 | |
| JP | 2005-177899 | A | | 7/2005 | |
| JP | 2015-163426 | A | | 9/2015 | |
| JP | 2016-032864 | A | | 3/2016 | |
| KR | 100966740 | B1 | | 6/2010 | |
| WO | 2012/026571 | A1 | | 3/2012 | |
| WO | 2017/010400 | A1 | | 1/2017 | |

OTHER PUBLICATIONS

Extended European Search Report issued in related European Patent Application No. 18837343.5 mailed Jun. 26, 2020, 8 pgs.

Chinese Office Action for a corresponding Application No. 201880048102.7, dated Aug. 3, 2022, with its English translation, 13 pgs.

Chinese Office Action for corresponding Application No. 201880048102.7, dated Feb. 15, 2023, with its English translation, 18 pgs.

Korean Office Action for corresponding Application No. 10-2020-7001912, dated Feb. 28, 2023, with its English translation, 5 pgs.

* cited by examiner

HYDRAULIC HAMMERING DEVICE

CROSS-REFERENCE TO RELATED APPLICATION(S)

This application is a divisional of U.S. application patent Ser. No. 16/633,553, filed Jan. 23, 2020, the entire disclosure of which is hereby incorporated by reference.

TECHNICAL FIELD

The present invention relates to a hydraulic hammering device, such as a rock drill and a breaker, and particularly relates to a technology for automatically switching a stroke of a piston between a regular stroke and a short stroke that is shorter than the regular stroke and an idle strike prevention technology enabling striking operation of the piston to be automatically suspended.

BACKGROUND

For hydraulic hammering devices of this type, various types of technologies for, by automatically switching a stroke of the piston to a stroke selected from a regular stroke and a short stroke depending on hardness of bedrock (the amount of penetration into the bedrock) and thereby appropriately adjusting striking power, reducing an excessive load on a striking portion, such as a rod and a rod pin, that is, "auto-stroke mechanisms", have been proposed.

For example, in a technology described in US Patent Publication No. 2014/0326473 A1, when stroke control of the piston is performed, a throttle is disposed to an oil passage that makes a valve for stroke control operate and switching timings are adjusted by means of the throttle.

Meanwhile, various types of idle strike prevention technologies that enable striking operation of the piston to be automatically suspended, that is, "idle strike prevention mechanisms", have been proposed.

For example, in an idle strike prevention mechanism described in JP Patent Publication No. 4-300172 A, when the piston advances by a predetermined amount beyond an impact point, the idle strike prevention mechanism works and causes both the front chamber and the rear chamber to be connected to low pressure. This configuration causes the piston to reach the stroke end in front by means of gas pressure in a back head and striking to be automatically suspended. In addition, the hydraulic hammering device is configured in such a way that, when an operator cancels the operation of the idle strike prevention mechanism by pressing the rod onto a crushing target and thereby making the piston retract, the front chamber is connected to high pressure, causing the piston starts to retract and the striking cycle is resumed.

BRIEF SUMMARY

The auto-stroke mechanism and the idle strike prevention mechanism are separate technologies each of which has a different aim and operational effect and are used differently depending on desired operation details. That is, when a state of bedrock serving as a crushing target changes, such as natural ground drilling, it is preferable to use a hydraulic breaker conforming to an auto-stroke specification. On the other hand, when operation and suspension of a striking device are repeated, such as crushing work, it is preferable to use a hydraulic breaker conforming to an idle strike prevention specification.

While, in order to use one hydraulic breaker in both natural ground drilling and crushing work, it is required to equip the hydraulic breaker with the auto-stroke mechanism and the idle strike prevention mechanism, there has been a problem in that making both the auto-stroke mechanism described in US Patent Publication No. 2014/0326473 A1 and the idle strike prevention mechanism described in JP Patent Publication No. 4-300172 A work in a compatible manner makes a circuit configuration complex and raises cost.

Accordingly, the present invention has been made focusing on such a problem, and a problem to be solved by the present invention is to provide a hydraulic hammering device that enables an auto-stroke mechanism and an idle strike prevention mechanism to coexist with a simple circuit configuration and either of the mechanisms to be easily selected.

In order to solve the problem mentioned above, according to one aspect of the present invention, there is provided a hydraulic hammering device including: a cylinder; a piston configured to be slidably fitted into the cylinder in such a manner as to be capable of advancing and retracting; a first control valve configured to control advancing and retracting movements of the piston; an auto-stroke mechanism configured to switch a piston stroke of the piston between a regular stroke and a short stroke shorter than the regular stroke; an idle strike prevention mechanism configured to decompress an inside of a circuit configured to hydraulically drive the piston to lower than a working pressure; and a second control valve configured to select either mode of the auto-stroke mechanism and the idle strike prevention mechanism, wherein, to the second control valve, a shared spool including an auto-stroke setting portion and an idle strike prevention setting portion at the same time is slidably fitted, and a mode selection means for allowing and cutting off both of supply of pressurized oil to the auto-stroke setting portion and discharge of pressurized oil from the idle strike prevention setting portion is disposed, and the mode selection means is configured in such a way that: when, while allowing pressurized oil to be supplied to the auto-stroke setting portion, prohibiting pressurized oil from being discharged from the idle strike prevention setting portion, the auto-stroke mechanism is selected, and when, while prohibiting pressurized oil from being supplied to the auto-stroke setting portion, allowing pressurized oil to be discharged from the idle strike prevention setting portion, the idle strike prevention mechanism is selected.

In addition, in order to solve the problem mentioned above, according to anther aspect of the present invention, there is provided a hydraulic hammering device comprising: a cylinder; a piston configured to be slidably fitted into the cylinder in such a manner as to be capable of advancing and retracting; a first control valve configured to control advancing and retracting movements of the piston; an auto-stroke mechanism configured to switch a piston stroke of the piston between a regular stroke and a short stroke shorter than the regular stroke; an idle strike prevention mechanism configured to decompress an inside of a circuit configured to hydraulically drive the piston to lower than a working pressure; and a second control valve configured to select either mode of the auto-stroke mechanism and the idle strike prevention mechanism, wherein the second control valve includes a spool slidably-fitting portion into which, as a spool for selecting a mode, a spool for auto-stroke or a spool for idle strike prevention is slidably fitted in a replaceable manner, and when the spool for auto-stroke is slidably fitted into the spool slidably-fitting portion, the auto-stroke mechanism is selected, and, when the spool for idle strike prevention is slidably fitted into the spool slidably-fitting portion, the idle strike prevention mechanism is selected.

According to the present invention, it is possible to enable an auto-stroke mechanism and an idle strike prevention mechanism to coexist with a simple circuit configuration and either of the mechanisms to be easily selected. The auto-stroke mechanism and the idle strike prevention mechanism may be respectively referred to as an auto-stroke mode and an idle strike prevention mode.

DETAILED DESCRIPTION

Hereinafter, a first embodiment of the present invention will be described with reference to the drawings as appropriate. The drawings are schematic. Therefore, it should be noted that a quantity such as the relation or ratio of thickness to surface dimension may be different from the actual one, and the dimensional relation and ratio of parts illustrated in respective drawings may be different from those in another drawing. In addition, each of the embodiments illustrated below exemplifies a device and a method for embodying a technical concept of the present invention, which does not limit the material, shape, structure, arrangement, etc. of component parts to those in embodiments below.

First Embodiment

First, a first embodiment of a hydraulic hammering device according to one aspect of the present invention will be described.

In the first embodiment, a spool that is slidably fitted into a second control valve has a configuration in accordance with a shared specification common to an auto-stroke specification and an idle strike prevention specification, and the first embodiment is an example in which disposing a mode selection means in a hydraulic circuit enables selection of either an auto-stroke mechanism or an idle strike prevention mechanism.

Figure 1:
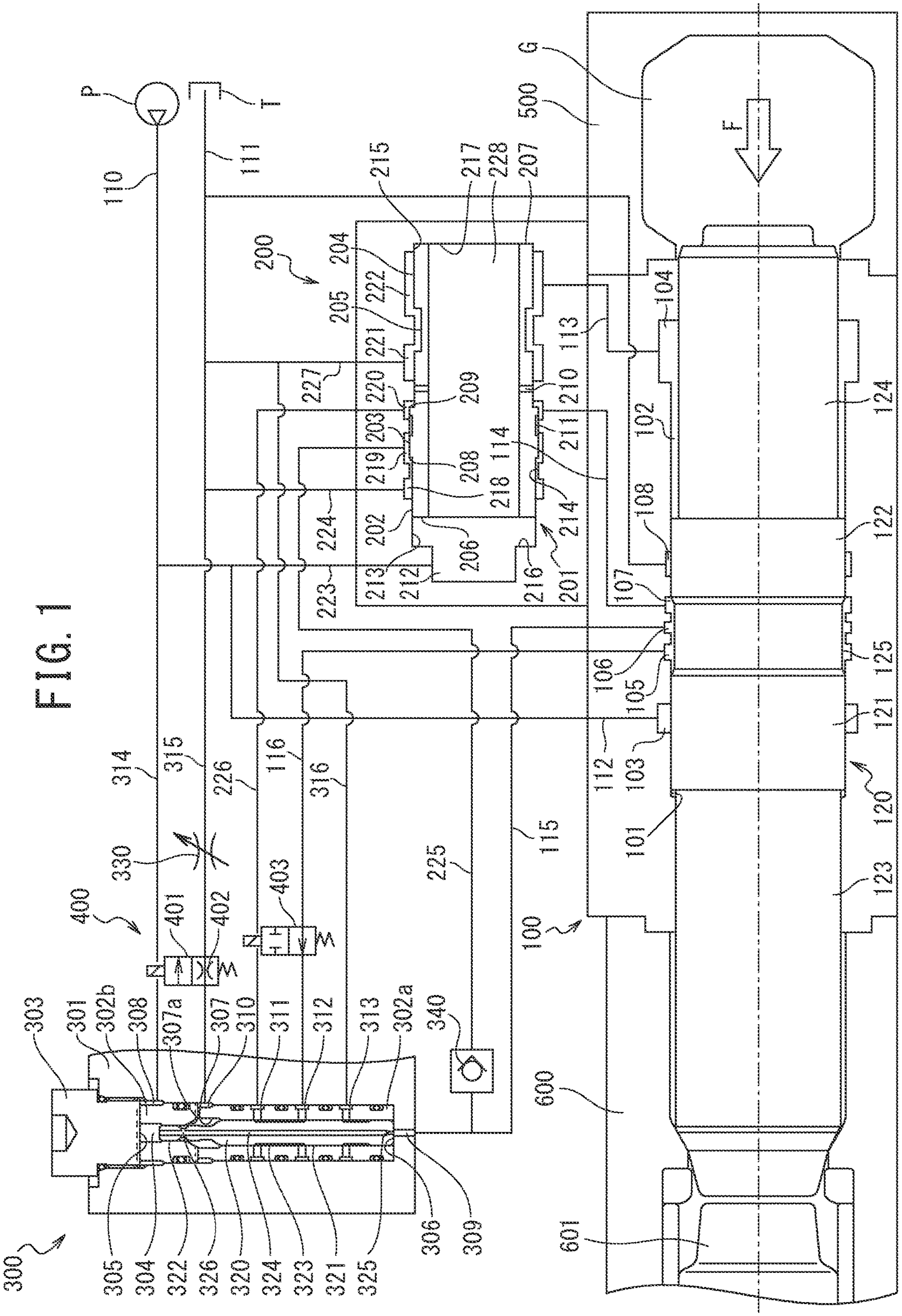
FIG. 1 is a schematic explanatory diagram of a first embodiment of a hydraulic hammering device according to one aspect of the present invention, and the drawing illustrates a state in which a mode selection means is switched to an auto-stroke side.

In detail, as illustrated in FIG. 1, the hydraulic hammering device includes a cylinder 100 and a piston 120 and, in conjunction therewith, is provided with a first control valve 200 and a second control valve 300 as separate bodies from the cylinder 100. Inside the first control valve 200, a valve 201 is slidably fitted, and, inside the second control valve 300, a shared spool 320 is slidably fitted.

In the rear of the cylinder 100, a back head 500 is attached. The back head 500 is filled with high-pressure back head gas G. In addition, in front of the cylinder 100, a front head 600 is attached. Inside the front head 600, a rod 601 is slidably fitted.

The piston 120 is a solid cylindrical body and has, substantially in the middle thereof, a front-side large-diameter portion 121 and a rear-side large-diameter portion 122 as two large-diameter portions. A medium-diameter portion 123 is disposed in front of the front-side large-diameter portion 121, a small-diameter portion 124 is disposed in the rear of the rear-side large-diameter portion 122, and an annular groove 125 is disposed between the front-side large-diameter portion 121 and the rear-side large-diameter portion 122.

The piston 120 being slidably fitted inside the cylinder 100 causes a piston front chamber 101 and a piston rear chamber 102 to be defined on the front and rear sides in the cylinder 100, respectively. A front chamber port 103 is disposed to the piston front chamber 101, and the front chamber port 103 is constantly connected to a high pressure circuit 110 via a front chamber passage 112.

To the piston rear chamber 102, a rear chamber port 104 is disposed. The rear chamber port 104 and the first control valve 200 are connected to each other by a rear chamber passage 113. The piston rear chamber 102 is configured to be capable of alternately communicating with either the high pressure circuit 110 or a low pressure circuit 111 by means of switching of the valve 201 of the first control valve 200 between advancement and retraction. Note that, at an appropriate location along the high pressure circuit 110, an accumulator (not illustrated) is disposed.

Outer diameter of the medium-diameter portion 123 is set larger than outer diameter of the small-diameter portion 124. This causes, of pressure receiving areas of the piston 120 in the piston front chamber 101 and the piston rear chamber 102, that is, a diameter difference between the front-side large-diameter portion 121 and the medium-diameter portion 123 and a diameter difference between the rear-side large-diameter portion 122 and the small-diameter portion 124, one in the piston rear chamber 102 to have a larger value than the other.

Because of this, when the piston rear chamber 102 is connected to high pressure by actuation of the valve 201, the piston 120 is configured to advance due to the pressure receiving area difference, and, when the piston rear chamber 102 is connected to low pressure by actuation of the valve 201, the piston 120 is configured to retract.

The hydraulic hammering device includes, in a selectable manner, an auto-stroke mechanism configured to make the piston 120 advance and retract in the cylinder 100 with a stroke automatically selected out of a regular stroke and a short stroke, which is shorter than the regular stroke, and thereby strike the rod 601 and an idle strike prevention mechanism configured to control, depending on an advanced or retracted position of the piston 120, whether pressurized oil supplied to the piston front chamber 101 is maintained at a starting pressure or higher or pressurized oil supplied to the piston front chamber 101 is set at a striking suspension pressure that exceeds an open pressure and is lower than the starting pressure.

In the present embodiment, switching between the auto-stroke mechanism and the idle strike prevention mechanism is performed by operating a mode selection means 400.

In detail, to the cylinder 100, a stroke control port 105, a spool control port 106, a valve control port 107, and a low pressure port 108 are disposed at positions separated from one another in the axial direction between the front chamber port 103 and the rear chamber port 104. In this way, the stroke control port 105 and the valve control port 107 are free of a connection to one another.

The first control valve 200 has a valve chamber 212 formed on the inside thereof, the valve chamber 212 being formed in a non-concentric manner with respect to the piston 120, and, in the valve chamber 212, a valve 201 is slidably fitted. The valve chamber 212 includes a valve front chamber 213 having a medium diameter, a valve main chamber 214 having a large diameter, and a valve rear chamber 215 having a small diameter in this order from the front to the rear. To the valve front chamber 213, a front chamber passage 223 in constant communication with the high pressure circuit 110 is connected.

To the valve main chamber 214, a front-side low pressure port 218, a reset port 219, and a valve control port 220 are disposed in this order from the front to the rear, and, to the valve rear chamber 215, a rear-side low pressure port 221 and a rear chamber port 222 are disposed. The front-side low pressure port 218 is in constant communication with the low pressure circuit 111 via a front-side low pressure passage 224, and the rear-side low pressure port 221 is in constant communication with the low pressure circuit 111 via a rear-side low pressure passage 227. The valve control port 220 and the valve control port 107 are in communication with each other via a valve control passage (direct connection) 114. The rear chamber port 222 and the rear chamber port 104 are in communication with each other via a rear chamber passage 113.

The valve 201 is a hollow cylindrical body and includes a medium-diameter portion 202, a large-diameter portion 203, and a small-diameter portion 204 in this order from the front to the rear. A hollow passage 228 on the inner side of the cylinder is in constant communication with the high pressure circuit 110 via the front chamber passage 223. To the valve 201, an oil discharge groove 205 for switching pressure in the piston rear chamber 102 between high pressure and low pressure is disposed in an annular manner on a substantially middle portion of the outer peripheral surface of the small-diameter portion 204. On the front side of the valve 201 with respect to the oil discharge groove 205, communication holes 210 are formed in a penetrating manner in radial directions of the valve 201, and, on a front-side portion of the outer peripheral surface of the large-diameter portion 203, slit grooves 211 are formed in slit shapes along the axial direction.

The valve 201 of the present embodiment is constantly biased rearward due to a pressure receiving area difference between the medium-diameter portion 202 and the small-diameter portion 204 and is configured to, when high pressure oil is supplied to the valve control port 220, move forward because pressure receiving area of a rear-side stepped surface 209 of the large-diameter portion 203 is added to the pressure receiving area difference. A reference number 208 denotes a front-side stepped surface of the large-diameter portion 203.

When the valve 201 reaches the rear end position, that is, when a rear end surface 207 thereof comes into contact with a valve chamber rear end surface 217, the piston rear chamber 102 is connected to low pressure because the oil discharge groove 205 causes the rear chamber port 222 to come into communication with the low pressure circuit 111 via the rear-side low pressure port 221 and the rear-side low pressure passage 227.

On the other hand, when the valve 201 reaches the front end position, that is, when a front end surface 206 thereof comes into contact with a valve chamber front end surface 216, the piston rear chamber 102 is configured to be connected to high pressure because the rear chamber port 222 has its communication with the rear-side low pressure port 221 cut off and, in conjunction therewith, comes into communication with the valve chamber 212, which is connected to high pressure, via a passage between the rear end surface 207 and the valve chamber rear end surface 217 and the hollow passage 228.

In the hydraulic breaker, because the valve control port 220 has to be maintained at high pressure or low pressure, the valve 201 requires a retention mechanism for maintaining the valve 201 in a halting state at switching positions thereof at the front end and the rear end.

In the present embodiment, the retention mechanism when the valve 201 is positioned at the rear end position is the slit grooves 211. When the valve 201 is positioned at the rear end position, the slit grooves 211 are configured to, by communicating the valve control port 220, the reset port 219, and the front-side low pressure port 218 with one another, surely connect the rear-side stepped surface 209 to low pressure and thereby maintain the halting state of the valve 201.

In addition, the retention mechanism when the valve 201 is positioned at the front end position is the communication holes 210. When the valve 201 is positioned at the front end position, the communication holes 210 are configured to, by replenishing the valve control port 220 (and the reset port 219) with pressurized oil from the hollow passage 228, prevent retention pressure from decreasing and thereby maintain the halting state of the valve 201.

The hydraulic hammering device of the present embodiment includes the second control valve 300, which is disposed adjacent to the above-described first control valve 200 and on a side surface of the cylinder 100. Note that, in FIG. 1, the second control valve 300 is illustrated at a position apart from the cylinder 100 and the first control valve 200 for the purpose of illustration.

The second control valve 300 has a first sleeve **302*a* and a second sleeve 302*b* loaded in a substantially cuboid-shaped housing 301 and has a spool chamber 304 formed by the first sleeve 302*a* and the second sleeve 302*b*. Positions in the axial direction of the first sleeve 302*a* and the second sleeve 302*b* are fixed by screwing down a plug 303 that is screwed into an opening on an upper portion of the housing 301**.

The shared spool 320 being slidably fitted in the spool chamber 304 so as to be capable of moving in a sliding manner causes a high pressure chamber 305 and a control chamber 306 to be defined above and below the shared spool 320, respectively, and, in conjunction therewith, a decompression chamber 307 to be defined at a position between the high pressure chamber 305 and the control chamber 306. That is, the high pressure chamber 305 and the control chamber 306 are spaced apart by the shared spool 320.

The shared spool 320 is a cylindrical member constituted by a large-diameter portion 321 and a small-diameter portion 322, and, on the outer periphery of the large-diameter portion 321, an annular communication groove 323 is disposed. At the axis of the shared spool 320, a through-hole 324 is formed along the axis, and an orifice 325 is disposed on the large-diameter portion 321 side of the through-hole 324. On the small-diameter portion 322 side of the through-hole 324, lateral holes 326 are formed in the direction intersecting the axis at right angles. The lateral holes 326 are formed in such a way as to come into communication with the decompression chamber 307 via a gap 307*a* when the shared spool 320 moves to the lower end position.

To the housing 301, a high pressure port 308 configured to communicate with the high pressure chamber 305 is disposed and, in conjunction therewith, a control port 309 configured to communicate with the control chamber 306 and a decompression port 310 configured to communicate with the decompression chamber 307 are respectively disposed. In addition, to the housing 301, a valve communication port 311 and a cylinder communication port 312 are disposed at positions facing the communication groove 323 and a low pressure port 313 is disposed at a position between the cylinder communication port 312 and the control port 309.

The high pressure port 308 is in communication with the high pressure circuit 110 by way of a high pressure passage 314, and the high pressure chamber 305 is therefore constantly connected to high pressure. The control port 309 communicates with the spool control port 106 by way of a spool control passage 115 and, in conjunction therewith, communicates with the reset port 219 by way of a reset passage 225. To the reset port 219, a check valve 340 is disposed in such a way as to allow pressurized oil to flow from the reset port 219 side to the control port 309 side.

The decompression port 310 is in communication with the low pressure circuit 111 by way of a decompression passage 315, and, to the decompression passage 315, a first switching valve 401 and a variable throttle 330 are disposed in this order from the decompression port 310 side to the low pressure circuit 111 side. The first switching valve 401 is a two-position electromagnetic switching valve the upper position of which is configured to allow communication and the lower position of which is configured to allow communication through a throttle 402. The first switching valve 401 is regularly switched to the lower position. The valve communication port 311 is in communication with the valve control port 220 by way of a valve control passage (via spool) 226.

The cylinder communication port 312 is in communication with the stroke control port 105 by way of a stroke control passage 116. To the stroke control passage 116, a second switching valve 403 is disposed. The second switching valve 403 is a two-position electromagnetic switching valve the upper position of which is configured to close a passage and the lower position of which is configured to allow communication and is regularly switched to the lower position. The low pressure port 313 is in communication with the low pressure circuit 111 by way of a low pressure passage 316. In the hydraulic hammering device of the present embodiment, the first switching valve 401 and the second switching valve 403 correspond to a "mode selection means" described in the above-described solution to problem.

In the hydraulic hammering device of the present embodiment, when the control port 309 is supplied with high pressure oil, the shared spool 320 is configured to move to the upper side due to a pressure receiving area difference between the surfaces of the shared spool 320 in the control chamber 306 and the high pressure chamber 305 caused by a diameter difference between the large-diameter portion 321 and the small-diameter portion 322, and, when the control port 309 is under low pressure without being supplied with high pressure oil, the shared spool 320 is configured to move to the lower side as illustrated in FIG.

The second control valve 300 is configured in such a way that, when the shared spool 320 moves to the lower side, the valve communication port 311 and the cylinder communication port 312 comes into communication with each other by way of the communication groove 323 and the stroke control port 105 and the valve control port 220 thereby comes into communication with each other and, when the shared spool 320 moves to the upper side, communication between the valve communication port 311 and the cylinder communication port 312 is cut off.

Hereinafter, a position to which the shared spool 320 moves to the upper side is also referred to as a "regular stroke position", and a position to which the shared spool 320 moves toward the lower side is also referred to as a "short stroke position". In addition, a position to which the piston 120 advances by a predetermined amount beyond an impact point at the time of an advancing movement, as an advanced or retracted position of the piston 120, is also referred to as a "switch position".

A flow rate adjustment amount δ1 by the throttle 402 is set in such a way that pressurized oil in the decompression chamber 307 is allowed to leak and flow out to the low pressure circuit 111. On the other hand, a flow rate adjustment amount δ2 by the variable throttle 330 is set in such a way that pressurized oil in the decompression chamber 307 is decompressed to a pressure lower than the starting pressure. A relationship between δ1 and δ2 is expressed by Formula 1 below.

$$\delta 1 > \delta 2 \qquad \text{(Formula 1)}$$

When the first switching valve 401 and second switching valve 403 of the mode selection means 400 are switched to a respective regular position illustrated in FIG. 1, the decompression chamber 307 never exerts a decompression action even when the shared spool 320 moves toward the lower side. That is, when in the regular position, the mode selection means permits the decompression chamber 307 to be free of exerting a decompression action on the shared spool 320 via the pressurized oil being released into the decompression passage 315. Meanwhile, because movements of the shared spool 320 to the upper and lower sides cause the stroke control port 105 and the valve control port 220 to be connected and cut off from each other and, in conjunction therewith, the reset port 219 and the control port 309 to be connected to each other, the hydraulic hammering device is operated in accordance with an "auto-stroke specification".

Figure 3:
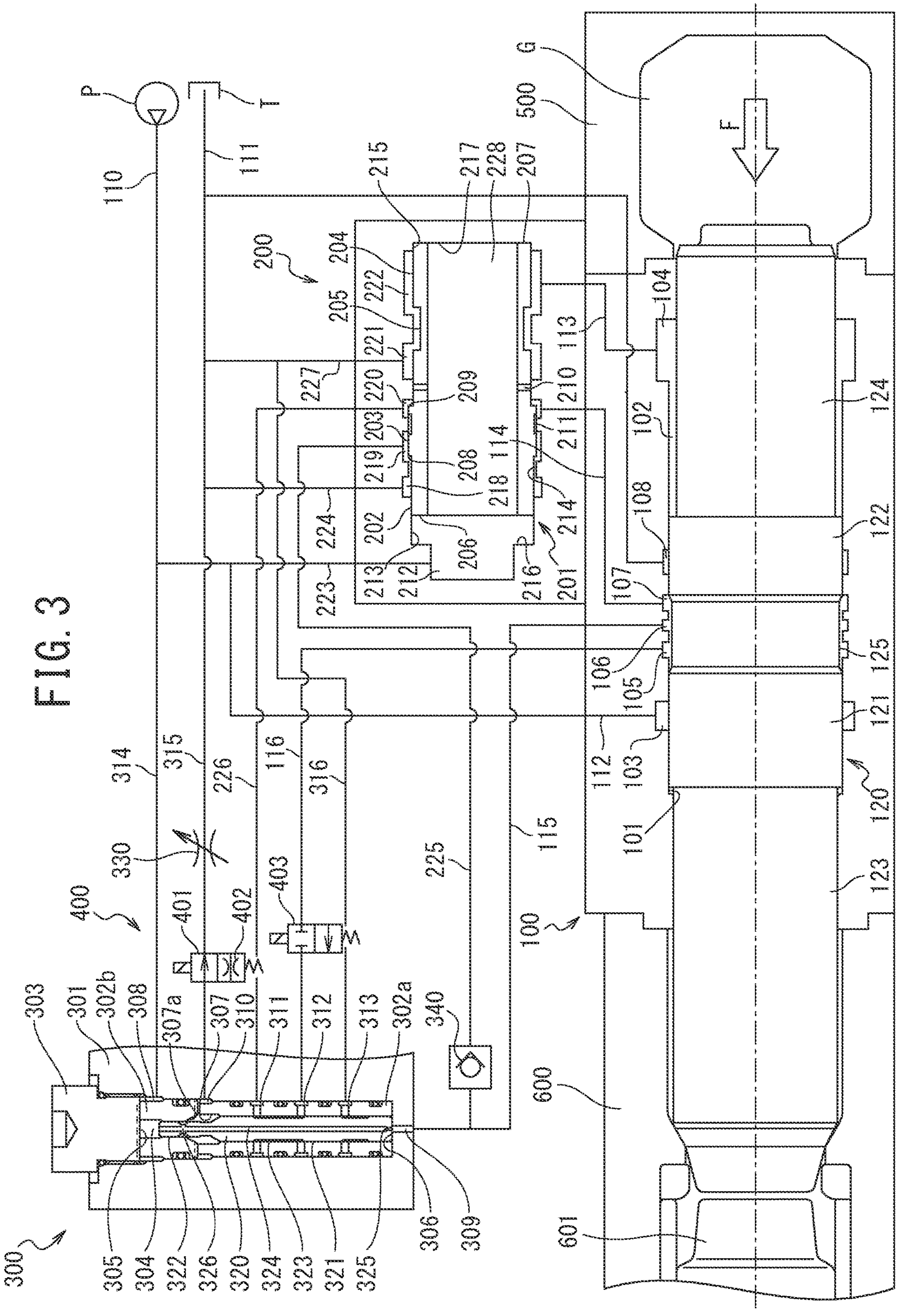
FIG. 3 illustrates a state in which the mode selection means is switched to an idle strike prevention side in the hydraulic hammering device of the first embodiment.

On the other hand, when the first switching valve 401 and second switching valve 403 of the mode selection means 400 are switched to the upper positions illustrated in FIG. 3, the decompression chamber 307 exerts a decompression action by means of the variable throttle 330 when the shared spool 320 moves toward the lower side. That is, when in the upper position, the mode selection means permits the decompression chamber 307 to exert a decompression action on the shared spool 320 by the pressurized oil being supplied into the decompression passage 315. In some implementations, the variable throttle 330 assists the decompression chamber 307 in exerting the decompression action. Meanwhile, because even when the shared spool 320 moves to the upper and lower sides, the stroke control port 105 and the valve control port 220 are never connected to each other, the hydraulic hammering device is operated in accordance with an "idle strike prevention specification".

Auto-Stroke Specification in First Embodiment

Next, operation and actions and effects of the hydraulic hammering device of the first embodiment when operated in accordance with the above-described auto-stroke specification will be described.

When the hydraulic hammering device of the first embodiment is in a state in which the first switching valve 401 and the second switching valve 403 are switched to the regular positions, the piston 120 is, in a pre-operation state, pressed forward by pressing force F, which is generated by the high-pressure back head gas G filled in the back head 500, as illustrated in FIG. 1. Thus, the piston 120 is positioned at a front dead point.

At the time of starting operation, when the piston 120 is positioned at the front dead point, in the shared spool 320 of the second control valve 300, the high pressure chamber 305 thereabove, illustrated in the drawing, is constantly connected to the front chamber passage 112 and the control chamber 306 therebelow is connected to the low pressure circuit 111. Thus, the shared spool 320 is pressed downward in the drawing and is positioned at the "short stroke position".

In addition, at the time of starting operation, in the first control valve 200, the valve front chamber 213 is supplied with high pressure oil in the front chamber passage 112. Thus, the valve 201 is positioned at a retracted position. When the valve 201 of the first control valve 200 is positioned at the retracted position, the first control valve 200 connects the piston rear chamber 102 to the low pressure circuit 111.

When the hydraulic hammering device is operated in this state, because, while high pressure oil in the front chamber passage 112 is supplied to the piston front chamber 101 and the piston front chamber 101 is thereby constantly set at high pressure, the piston rear chamber 102 is set at low pressure when the valve 201 of the first control valve 200 is positioned at the retracted position, the piston 120 is biased rearward and starts to retract.

Figure 2:
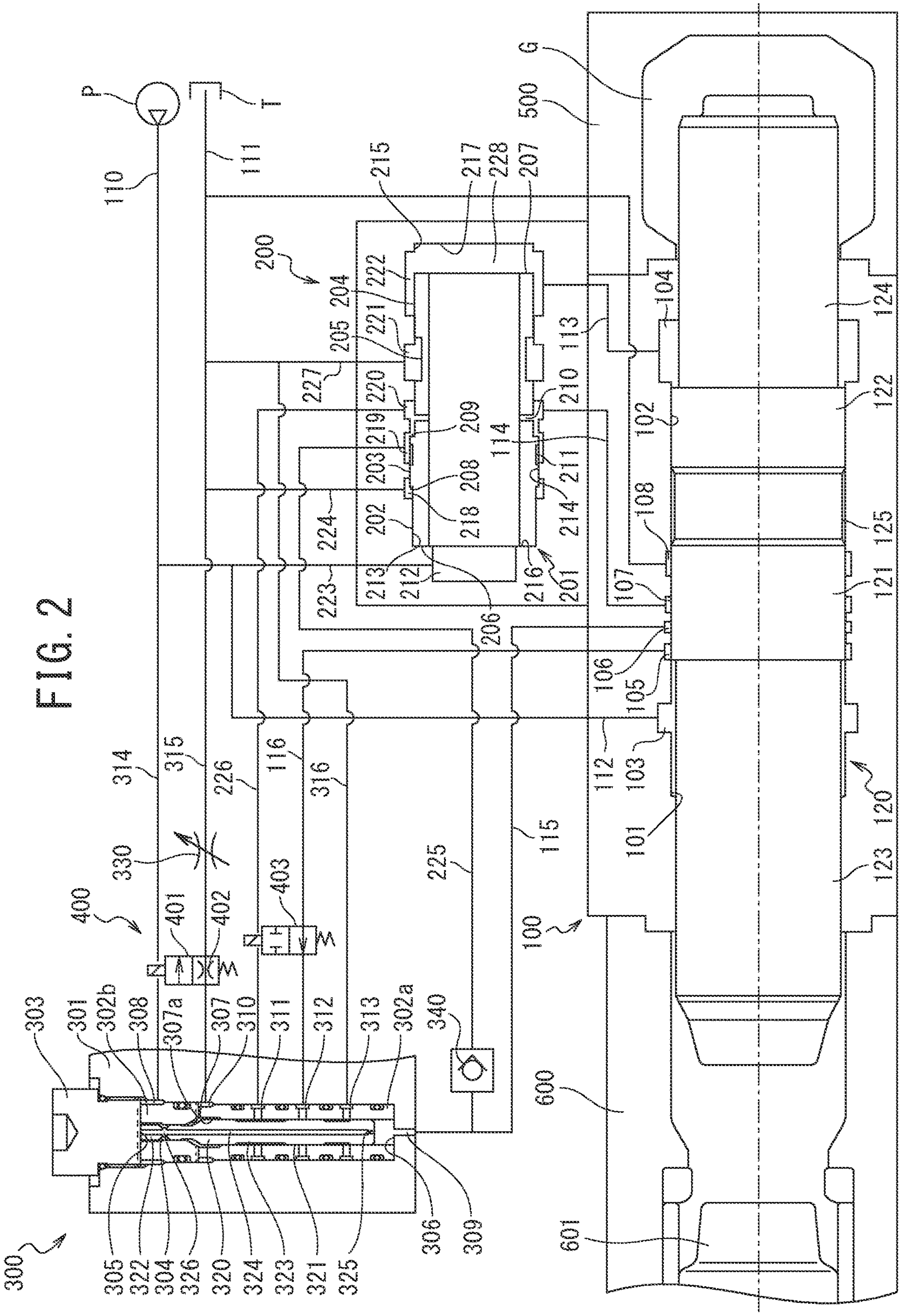
FIG. 2 is an explanatory diagram of operation in a state in which the mode selection means is switched to the auto-stroke side in the hydraulic hammering device of the first embodiment.

When, as illustrated in FIG. 2, the front end of the front-side large-diameter portion 121 of the piston 120 has retracted to the position of the stroke control port 105 of the cylinder 100, high pressure oil fed from the piston front chamber 101, which is constantly at high pressure, into the stroke control port 105 is fed into the valve control port 220 of the first control valve 200 via the communication groove 323 of the shared spool 320, which is, as illustrated in the drawing, positioned at the "short stroke position" in the second control valve 300.

In the first control valve 200, when the valve control port 220 is supplied with high pressure oil, the valve 201 moves forward with pressure receiving area of the rear-side stepped surface 209 added. Because this causes the rear chamber port 222 to come into communication with the valve chamber 212, which is connected to high pressure, via a passage between the rear end surface 207 of the valve 201 and the valve chamber rear end surface 217 and the hollow passage 228, the piston rear chamber 102 is connected to high pressure. The piston rear chamber 102 is thus brought to high pressure, and the piston 120 starts to advance in a short stroke due to a pressure receiving area difference of the piston 120 itself.

In the auto-stroke specification of the present embodiment, constituent elements disposed as means for supplying pressurized oil to the control port 309 of the second control valve 300 are the check valve 340, the reset passage 225, and the reset port 219.

That is, when the valve 201 of the above-described first control valve 200 is switched to the advanced position, the valve control port 220 and the reset port 219 come into communication with each other by way of the rear-side stepped surface 209 and pressurized oil is supplied from the reset passage 225 to the control port 309 of the second control valve 300 via the check valve 340.

In the second control valve 300, this causes the shared spool 320 to be pressed upward in the drawing due to a pressure receiving area difference between the small-diameter portion 322 and the large-diameter portion 321, which are upper and lower portions of the shared spool 320, respectively, and to be switched to the "regular stroke position". At this time, the reset port 219 is replenished with pressurized oil from the communication hole 210 via the valve control port 220. Thus, a sufficient amount of pressurized oil required for retention of a halting state of the valve 201 and operation of the shared spool 320 of the second control valve 300 (upward movement in the drawing and retention of a halting state after the movement of the shared spool 320) is supplied.

Subsequently, when the piston 120 advances and passes the position of the impact point, that is, the rear end of the front-side large-diameter portion 121 of the piston 120 passes the position of the valve control port 107 of the cylinder 100, the low pressure port 108 and valve control port 107 of the cylinder 100 come into communication with each other, causing the valve control port 220 of the first control valve 200 to be connected to low pressure. This causes the valve 201 of the first control valve 200 to be pressed rearward and switched to the retracted position, in response to which the piston rear chamber 102 is brought to low pressure.

When the piston rear chamber 102 is brought to low pressure, the piston 120 retracts even with a small amount of penetration when bedrock is hard. At this time, because the second control valve 300 retains, in the control port 309 therebelow, pressurized oil communicating with the spool control port 106, the shared spool 320 of the second control valve 300 is maintained at the "regular stroke position".

That is, because the valve control port 107 of the cylinder 100 keeps communicating with the low pressure port 108 until the piston 120 retracts and switching of the valve 201 is performed, the valve control port 220 of the first control valve 200 keeps communicating with the low pressure port 108. This causes pressurized oil in the spool control port 106 of the cylinder 100 to be retained within a closed circuit. As a result, the shared spool 320 is retained at the "regular stroke position" lest the valve 201 is switched.

Subsequently, when the front end of the front-side large-diameter portion 121 of the piston 120 has retracted to the position of the valve control port 107 of the cylinder 100, the valve control port 107 comes into communication with high pressure oil in the piston front chamber 101. Thus, the high pressure oil is fed into the valve control port 220 of the first control valve 200 via the valve control port 107. Note that, although the front end of the front-side large-diameter portion 121 passes, in a process of retracting to the valve control port 107, the stroke control port 105 and the spool control port 106 in this order, the operation of the hydraulic hammering device is not affected because circuits extending from both ports are closed.

Because of this, the valve 201 of the first control valve 200 moves to the advanced position due to a pressure receiving area difference between the front and rear surfaces of the valve 201 and the rear chamber port 222 comes into communication with the valve chamber 212, which is connected to high pressure, via a passage between the rear end surface 207 of the valve 201 and the valve chamber rear end surface 217 and the hollow passage 228. As a result, the piston rear chamber 102 is connected to high pressure, bringing the piston rear chamber 102 to high pressure. Thus, the piston 120 starts to advance due to a pressure receiving area difference between the front and rear surfaces of the piston 120.

At this time, because, in the second control valve 300, operational pressurized oil in the first control valve 200 is fed from the reset port 219 into the control port 309 on the lower side of the second control valve 300 via the check valve 340 in the reset passage 225, the shared spool 320 is maintained at the "regular stroke position" on the upper side in the drawing due to the pressure receiving area difference between the small-diameter portion 322 and the large-diameter portion 321, which are upper and lower portions of the shared spool 320.

When the bedrock is soft, the piston 120, after having struck the bedrock, further advances beyond the position of the impact point. On this occasion, in the hydraulic hammering device of the present embodiment, when the piston 120 further advances beyond the position of the impact point and the rear end of the front-side large-diameter portion 121 of the piston 120 reaches a "switching position", at which the spool control port 106 of the cylinder 100 is formed, the spool control port 106 comes into communication with the low pressure port 108 and is thereby connected to low pressure. Thus, high pressure oil in the control port 309 on the lower side of the second control valve 300 is released, causing the shared spool 320 of the second control valve 300 to be pressed downward and switched to the "short stroke position".

Subsequently, when the piston 120 has retracted until the front end of the front-side large-diameter portion 121 of the piston 120 reaches the position of the stroke control port 105 of the cylinder 100, because in the second control valve 300 at this time the shared spool 320 is positioned at the "short stroke position", high pressure oil in the piston front chamber 101 is fed from the stroke control port 105 to the valve control port 220 of the first control valve 200 via the communication groove 323 of the second control valve 300.

Thus, the valve 201 of the first control valve 200 is switched to the advanced position, in response to which the piston rear chamber 102 is brought to high pressure. Therefore, the piston 120 starts to advance in the short stroke due to the pressure receiving area difference between the front and rear surfaces of the piston 120 itself. That is, according to the hydraulic hammering device, when bedrock is soft, the second control valve 300 is switched to the "short stroke position" at the "switching position", enabling the piston 120 to automatically perform striking in the short stroke.

When the valve 201 is switched to the advanced position, operational pressurized oil of the valve 201, which is fed into the valve control port 220, is fed from the reset port 219 of the first control valve 200 into the control port 309 on the lower side of the second control valve 300 via the check valve 340 in the reset passage 225.

Because of this, while the piston 120 is advancing in the short stroke and has not reached the "switching position", the second control valve 300 is pressed upward in the drawing due to the pressure receiving area difference between the small-diameter portion 322 and the large-diameter portion 321, which are upper and lower portions of the shared spool 320, respectively, and is switched to the "regular stroke position". In other words, the second control valve 300 is reset from a short stroke state to a regular stroke state.

While, thereafter, in the hydraulic hammering device, the piston 120, repeating advancing and retracting movements, strikes the rod 601 through collaboration among the piston 120, the first control valve 200, and the second control valve 300 according to hardness of bedrock when the hydraulic hammering device is set at the "auto-stroke specification", the piston 120 advances and retracts in the regular stroke when the bedrock is hard (that is, when the position of the piston 120 at the time of advancement does not reach the "switching position") and the piston 120 advances and retracts in the short stroke when the bedrock is soft (that is, when the position of the piston 120 at the time of advancement reaches the "switching position").

Therefore, according to the hydraulic hammering device, when the hydraulic hammering device is set at the auto-stroke specification, automatically switching the stroke of the piston 120 to a stroke selected from the short stroke and the regular stroke depending on the hardness of the bedrock (the amount of penetration into the bedrock) and thereby appropriately adjusting striking power enables an excessive load on striking portions, such as the rod 601 and a rod pin, to be reduced.

In particular, according to the hydraulic hammering device, because the stroke control port 105, the valve control port 107, and the spool control port 106, which is disposed at a position between the two ports 105 and 107, are disposed to the cylinder 100 and, while the high pressure chamber 305 at one end of the second control valve 300 is constantly set at high pressure, regarding the control chamber 306 at the other end of the second control valve 300, when the piston 120, at the time of advancement, reaches a position at which it is communicable with the spool control port 106, which coercively switches strokes, the second control valve 300 is switched to the "short stroke position" by communicating the control chamber 306 of the second control valve 300 with the low pressure circuit 111 and, in conjunction therewith, when the piston 120 retracts, the control chamber 306 is communicated with the front chamber passage 112 and the second control valve 300 is thereby switched to the "regular stroke position", at which the cylinder stroke is reset to the regular stroke, addition of the spool control port 106 to the cylinder 100 enables a simple structure in which no throttle is disposed to the second control valve 300 to be achieved and simple switching of oil passages depending on the position of the piston 120, which represents the amount of penetration into bedrock, enables the stroke of the piston 120 to be coercively switched. Thus, there is no possibility that the hydraulic hammering device is influenced by change in temperature of hydraulic oil compared with, for example, a structure in which a throttle is disposed to the second control valve 300. As a result, it can be said that the second control valve 300 has high operational stability.

Idle Strike Prevention Specification in First Embodiment

Next, operation and actions and effects of the hydraulic hammering device of the first embodiment when operated in accordance with the above-described "idle strike prevention specification" will be described.

When the hydraulic hammering device is in a state in which the first switching valve 401 and the second switching valve 403 are switched to the upper positions illustrated in FIG. 3 and is in a pre-operation state, the piston 120 is, as described above, pressed forward by the pressing force F, which is generated by the gas pressure of the back head gas G filled in the back head 500. Thus, the piston 120 is positioned at a front dead point illustrated in FIG. 3.

At the time of starting operation, when the piston 120 is positioned at the front dead point, in the shared spool 320 of the second control valve 300, the high pressure chamber 305 thereabove, illustrated in the drawing, constantly is connected to the front chamber passage 112 and the control chamber 306 therebelow is in communication with the spool control port 106 of the cylinder 100 via the spool control passage 115. Thus, pressurized oil supplied from the high pressure chamber 305 to the through-hole 324 at the center of the shared spool 320 leaks out to a tank via the spool control passage 115 and the spool control port 106. Therefore, the shared spool 320 is pressed downward in the drawing due to oil pressure on the high pressure chamber 305 side and is positioned at a "suspension control position".

In addition, at the time of starting operation, because pressurized oil from the front chamber passage 112 is supplied to the valve front chamber 213 of the first control valve 200 via the front chamber passage 223, the valve 201 of the first control valve 200 is positioned at the retracted position. When the valve 201 of the first control valve 200 is positioned at the retracted position, the first control valve 200 connects the piston rear chamber 102 to the low pressure circuit 111.

That is, before a pump starts to operate, the piston 120 is positioned at the front dead point by the forward pressing force F, generated by the back head gas G. When oil pressure works because of operation of the pump, the second control valve 300 moves to the lower side pressed by pressing force of pressurized oil working on the upper end surface of the shared spool 320. At this time, the pressurized oil supplied to the second control valve 300 is discharged from the decompression chamber 307, which is formed at the position of the small-diameter portion 322 of the shared spool 320, to the decompression passage 315 and is thereby decompressed. In addition, pressurized oil supplied to the through-hole 324 at the center of the shared spool 320 leeks out to the tank via the spool control passage 115, which is connected to the control port 309 on the lower side, and the spool control port 106.

Diameter and capacity of the orifice 325 of the through-hole 324 and the decompression chamber 307 are set in such a way that pressure of supplied pressurized oil is set at a striking suspension pressure that is a pressure exceeding the open pressure and lower than the starting pressure. Note that, in the present embodiment, the striking suspension pressure is set at a value within a range from 5 MPa to 8 MPa.

Thus, oil pressure working on the pressure receiving surface of the piston front chamber 101 of the piston 120 becomes lower than the starting pressure, and the piston 120 therefore cannot resist the forward pressing force F, generated by the back head gas G. Therefore, the piston 120 stays at the position of the front dead point, and the hydraulic hammering device does not operate if this state continues.

Although the hammering device does not operate while in the state illustrated in FIG. 3, the oil pressure set at the striking suspension pressure, which is a pressure exceeding the open pressure and lower than the starting pressure, works on the pressure receiving surface of the piston front chamber 101 against the forward pressing force F, generated by the back head gas G. Thus, it is possible to push in the rod 601 to the impact point with comparatively small power when operation in accordance with the idle strike prevention specification is to be canceled. The pushing-in operation of the rod 601 is performed by an operator pushing the rod 601 through manipulation of a boom, an arm, or the like of a platform truck.

Figure 4:
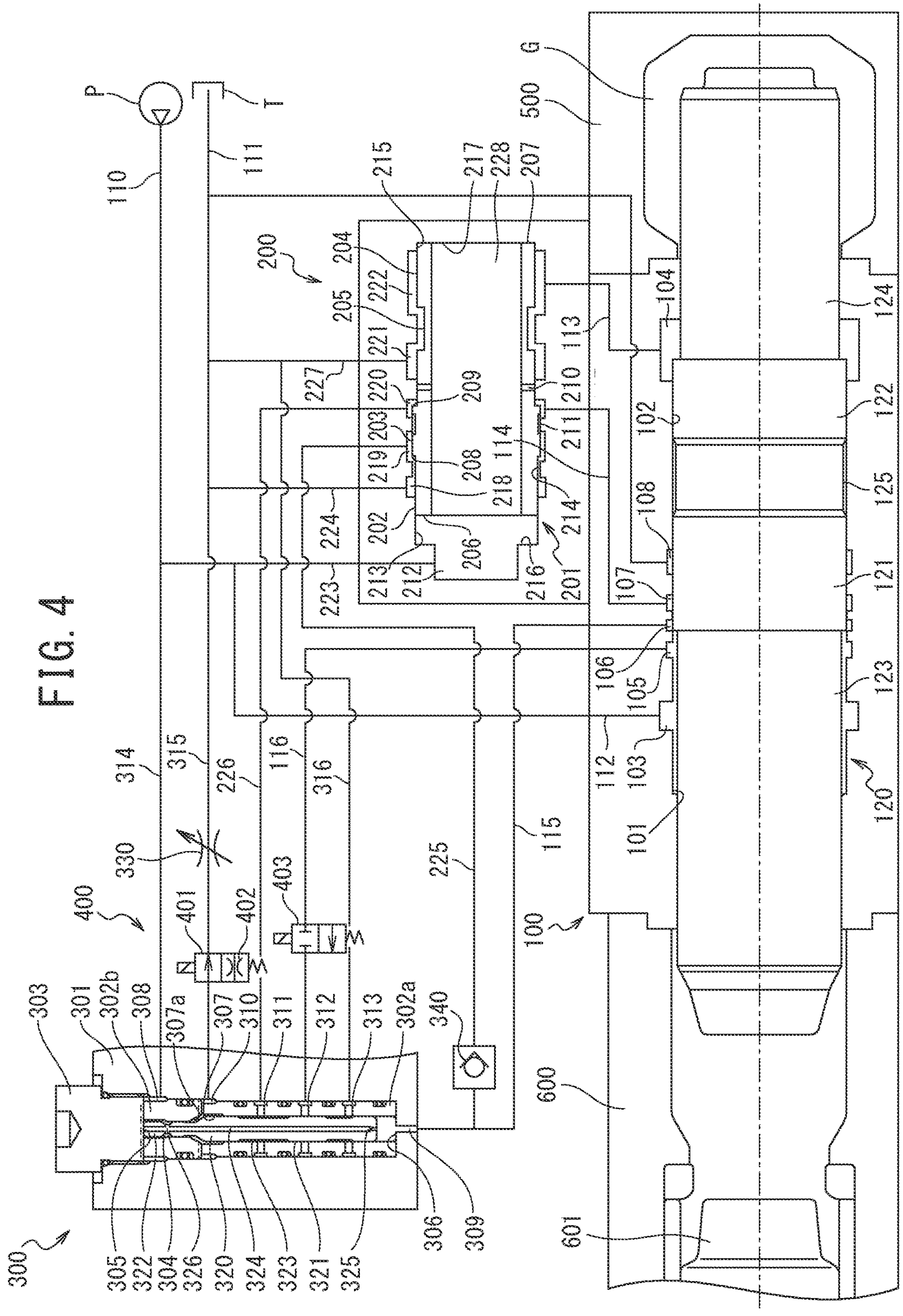
FIG. 4 is an explanatory diagram of operation in a state in which the mode selection means is switched to the idle strike prevention side in the hydraulic hammering device of the first embodiment.

The rod 601 being pushed in to the piston 120 side causes, as illustrated in FIG. 4, the piston 120, pushed by the rod 601, to retract and the front-side large-diameter portion 121 of the piston 120 to cut off a communication state between the spool control port 106 and low pressure port 108 of the cylinder 100. When the spool control port 106 is closed, pressure in the control chamber 306 below the shared spool 320 is raised because pressurized oil supplied to the high pressure chamber 305 above the shared spool 320 is supplied to the control chamber 306 via the through-hole 324 penetrating the center of the shared spool 320 and the orifice 325 at the lower end of the through-hole 324.

Because of this, the shared spool 320 is pushed upward by the pressurized oil due to the pressure receiving area difference between the small-diameter portion 322 and the large-diameter portion 321, which are upper and lower portions of the shared spool 320, respectively, and the shared spool 320 moves to the upper side and is positioned at a "regular striking position". When the shared spool 320 is positioned at the "regular striking position", the lateral holes 326 formed to the small-diameter portion 322, which is an upper portion of the shared spool 320, are shut off. Thus, pressure of pressurized oil in the front chamber passage 112 rises to the starting pressure or higher, the piston 120 retracts due to the starting pressure working on the pressure receiving surface of the piston 120 in the piston front chamber, and the hydraulic hammering device starts to operate.

When the hydraulic hammering device is operated, because, while high pressure oil in the front chamber passage 112 is supplied to the piston front chamber 101 and the piston front chamber 101 is thereby constantly set at high pressure, the piston rear chamber 102 is set at low pressure when the valve 201 of the first control valve 200 is positioned at the retracted position, the piston 120 is biased rearward and starts to retract.

When, as illustrated in FIG. 4, the front end of the front-side large-diameter portion 121 of the piston 120 has retracted to the position of the valve control port 107 of the cylinder 100, high pressure oil supplied from the piston front chamber 101, which is constantly at high pressure, into the valve control port 107 is fed into the valve control port 220, which is disposed to the lower side of the first control valve 200. In the first control valve 200, when the valve control port 220 is supplied with high pressure oil, the valve 201 moves forward with pressure receiving area of the rear-side stepped surface 209 added.

This causes the rear chamber port 222 to come into communication with the valve chamber 212, which is connected to high pressure, via a passage between the rear end surface 207 of the valve 201 and the valve chamber rear end surface 217 of the valve chamber 212 and the hollow passage 228. Thus, the piston rear chamber 102 is connected to high pressure via the rear chamber passage 113, which is connected to the rear chamber port 222. Because, therefore, the piston rear chamber 102 is brought to high pressure, the piston 120 starts to advance in a predetermined stroke according to the position of the valve control port 107 due to the pressure receiving area difference of the piston 120 itself.

Subsequently, when the piston 120 advances and passes the position of the impact point, that is, the rear end of the front-side large-diameter portion 121 of the piston 120 passes the position of the valve control port 107 of the cylinder 100, the low pressure port 108 and valve control port 107 of the cylinder 100 come into communication with each other via the annular groove 125 and the valve control port 220 of the first control valve 200 is connected to low pressure.

When the valve control port 220 is connected to low pressure, the valve 201 of the first control valve 200 is pressed rearward due to the pressure receiving area difference between the front and rear surfaces of the valve 201 and switched to the retracted position, in response to which the piston rear chamber 102 is brought to low pressure. When the piston rear chamber 102 is brought to low pressure, the piston 120 starts to retract even with a small amount of penetration when bedrock is hard. At this time, because the spool control port 106 is maintained in a shut-off state, the shared spool 320 of the second control valve 300 is maintained at the “regular striking position”.

In this way, when the bedrock is hard, the piston 120 can continuously retract. That is, the hydraulic hammering device is capable of, when the bedrock is hard, performing continuous regular striking in which the piston 120, repeating advancing and retracting movements, strikes the rod 601.

In contrast, when the bedrock is soft, the piston 120, after having struck the bedrock, further advances beyond the position of the impact point. On this occasion, in the hydraulic hammering device of the present embodiment, when the piston 120 has further advanced beyond the position of the impact point and the rear end of the front-side large-diameter portion 121 of the piston 120 has reached the “suspension control position”, at which the spool control port 106 of the cylinder 100 is formed, the spool control port 106 is connected to the low pressure circuit because of coming into communication with the low pressure port 108 via the annular groove 125. Thus, high pressure oil in the control port 309 below the shared spool 320 of the second control valve 300 is released.

Because of this, the shared spool 320 of the second control valve 300 is pressed downward by pressurized oil supplied to the high pressure chamber 305 and is switched to a “striking suspension position”. When the shared spool 320 is positioned at the “striking suspension position”, the pressurized oil supplied to the high pressure chamber 305 of the second control valve 300 is discharged from the above-described decompression chamber 307 to the decompression passage 315. Thus, the front chamber passage 112 is decompressed and pressure of pressurized oil working on the pressure receiving surface of the piston 120 in the piston front chamber is thereby reduced to lower than the starting pressure, and the piston 120 moves to the front dead point by the forward pressing force F, generated by the back head gas G, and automatically stops.

Therefore, the hydraulic hammering device is capable of, when set at the “idle strike prevention specification”, switching striking operation of the piston 120 depending on hardness of bedrock (the amount of penetration into the bedrock) in such a way as to perform continuous regular strikes when the bedrock is hard and to automatically stop the piston 120 when the bedrock is soft.

In particular, the hydraulic hammering device is capable of, when set at the idle strike prevention specification, stopping the piston 120 while the piston front chamber 101 exerts a cushioning action when the piston 120 is to be stopped at the position of the front dead point at the time of striking cycle suspension because pressure in the piston front chamber 101 is set at the striking suspension pressure of approximately 5 to 8 MPa, which exceeds the open pressure and is lower than the starting pressure. Thus, the piston 120 is prevented or suppressed from colliding against the front head 600 with great force. As a result, loads on both at the time of striking cycle suspension are reduced.

In addition, according to the hydraulic hammering device, because pressure of the pressurized oil working on the pressure receiving surface of the piston 120 in the piston front chamber is set at the striking suspension pressure of approximately 5 to 8 MPa when the piston 120 is positioned at the position of the front dead point, the hydraulic hammering device is capable of pushing in the rod 601 to the impact point with small power when the striking cycle is resumed and easily cutting off the communication state between the spool control port 106 of the cylinder and the low pressure port 108 of the cylinder 100. Thus, a cancel operation of the idle strike prevention specification is easy to perform.

In addition, according to the hydraulic hammering device, because working pressure rises from a state of being set at the striking suspension pressure of approximately 5 to 8 MPa when the piston 120 starts a retracting movement at the time of resumption of the striking cycles, variation in pressure at the time of state switching is comparatively mild, reaction force is comparatively small, and a load on constituent members of the hydraulic device is small. Therefore, it is possible to prevent or reduce malfunctions of respective components and unexpected troubles, such as an occurrence of looseness of a hose.

In addition, according to the hydraulic hammering device, because the hydraulic hammering device is configured in a simple structure in which the spool control port 106 is added to the cylinder 100 and enables striking operation of the piston 120 to be switched through simple switching of oil passages depending on the position of the piston 120, which represents the amount of penetration into bedrock, it can be said that operation of the second control valve 300 has high stability.

Second Embodiment

Next, a second embodiment of the present invention will be described with reference to the drawings as appropriate.

The second embodiment differs from the first embodiment in not including the mode selection means 400 as a switching valve and in that replacing, as a spool slidably fitted into a second control valve, a spool in accordance with an auto-stroke specification and a spool in accordance with an idle strike prevention specification with each other switches both modes.

Note that because, in the second embodiment, actions of an auto-stroke mechanism follow the same mechanism of action when the auto-stroke specification is selected in the hydraulic hammering device of the above-described first embodiment and actions of an idle strike prevention mechanism follow the same mechanism of action when the idle strike prevention specification is selected in the hydraulic hammering device of the above-described first embodiment, descriptions thereof are omitted in the present embodiment.

Figure 5:
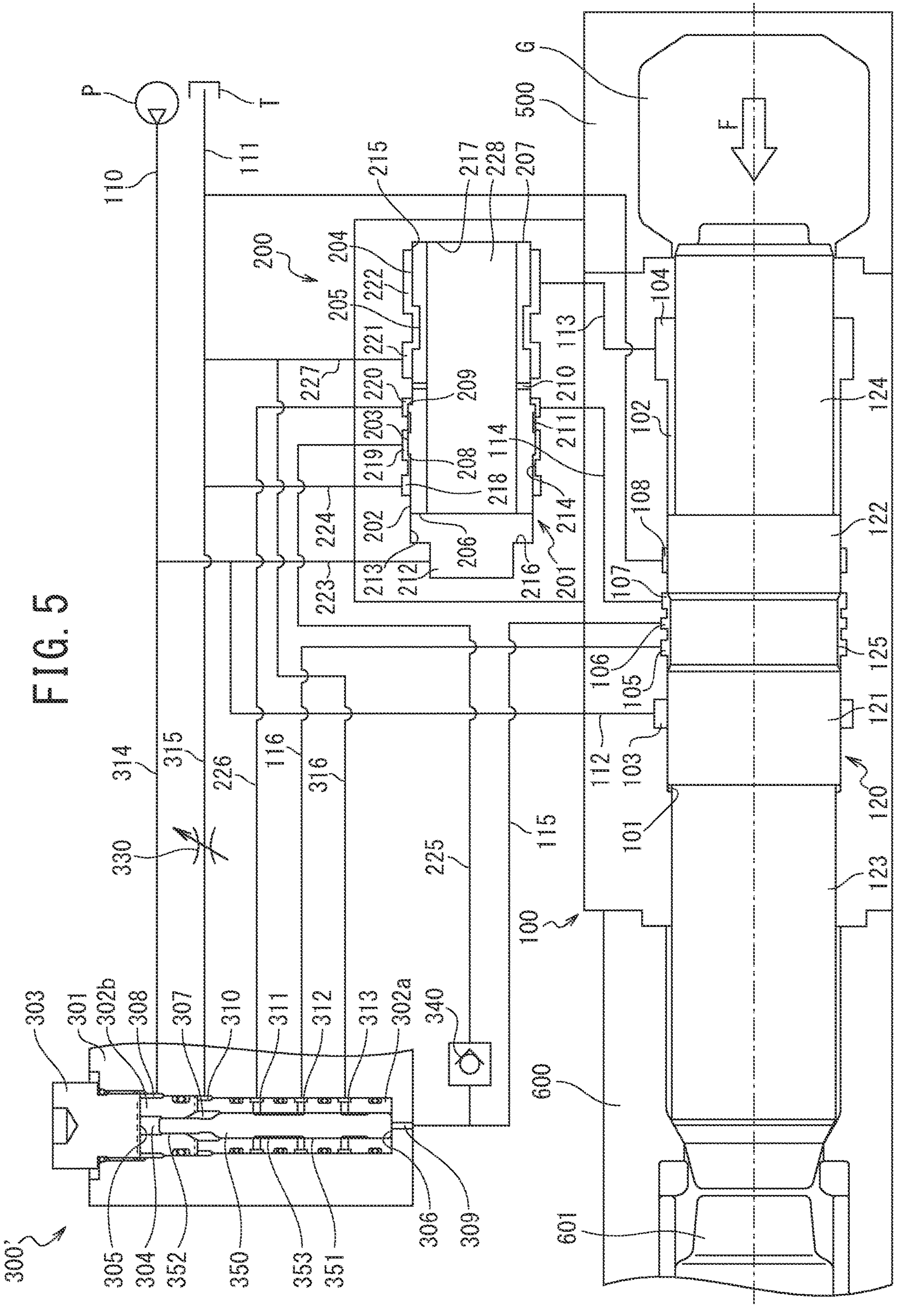
FIG. 5 is a schematic explanatory diagram of a second embodiment of the hydraulic hammering device according to the one aspect of the present invention, and the drawing is an explanatory diagram when a spool is replaced with a spool for an auto-stroke specification.
Figure 6:
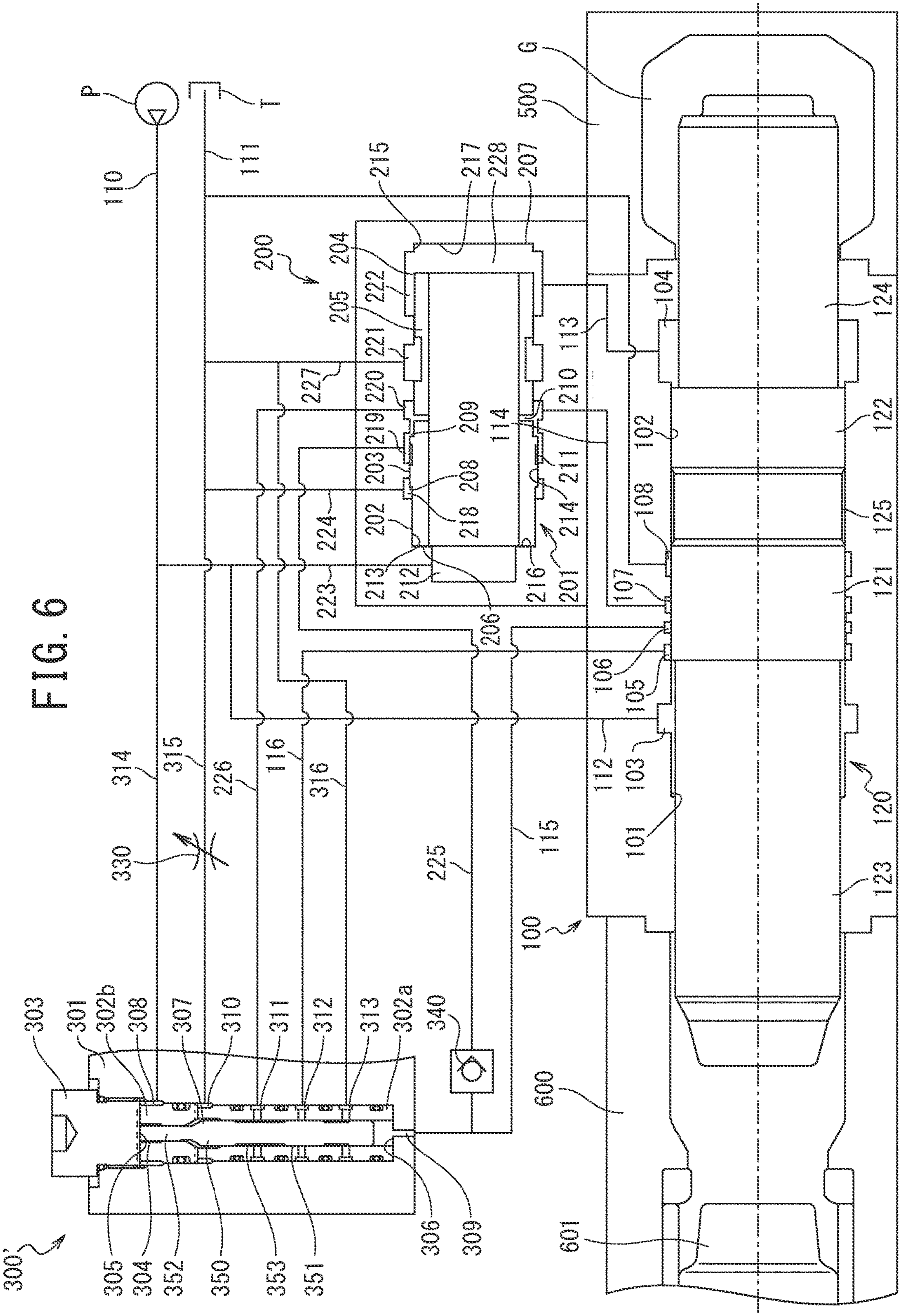
FIG. 6 is an explanatory diagram of operation when the spool is replaced with the spool for the auto-stroke specification in the hydraulic hammering device of the second embodiment.

FIGS. 5 and 6 illustrate states in which an auto-stroke spool 350 is slidably fitted into a second control valve 300'.

As illustrated in FIGS. 5 and 6, the auto-stroke spool 350 is a cylindrical member having a large-diameter portion 351 and a small-diameter portion 352, and, on the outer periphery of the large-diameter portion 351, an annular communication groove 353 is disposed. The communication groove 353 is formed in such a way as to communicate a valve communication port 311 and a cylinder communication port 312 with each other when the auto-stroke spool 350 moves to the lower end position.

A configuration of the other portion of the second control valve 300' is the same as that of the second control valve 300 of the first embodiment. Note that, in the case of the second control valve 300', because there is no possibility that a decompression chamber 307 communicates with a high pressure chamber 305, a decompression port 310 and a decompression passage 315 do not work as a decompression mechanism but function as a drain.

Figure 7:
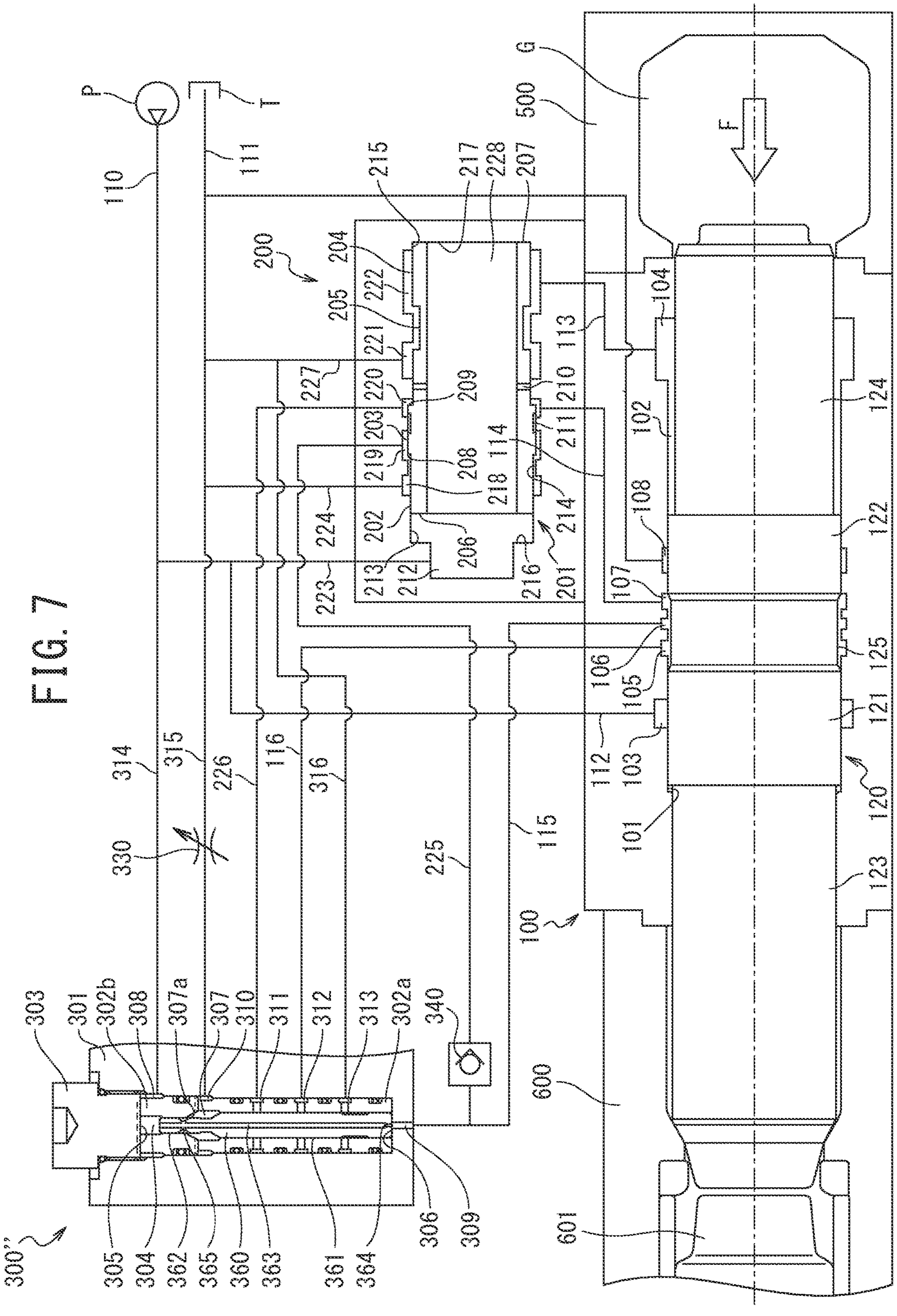
FIG. 7 is an explanatory diagram when the spool is replaced with a spool for an idle strike prevention specification in the hydraulic hammering device of the second embodiment of the present invention.
Figure 8:
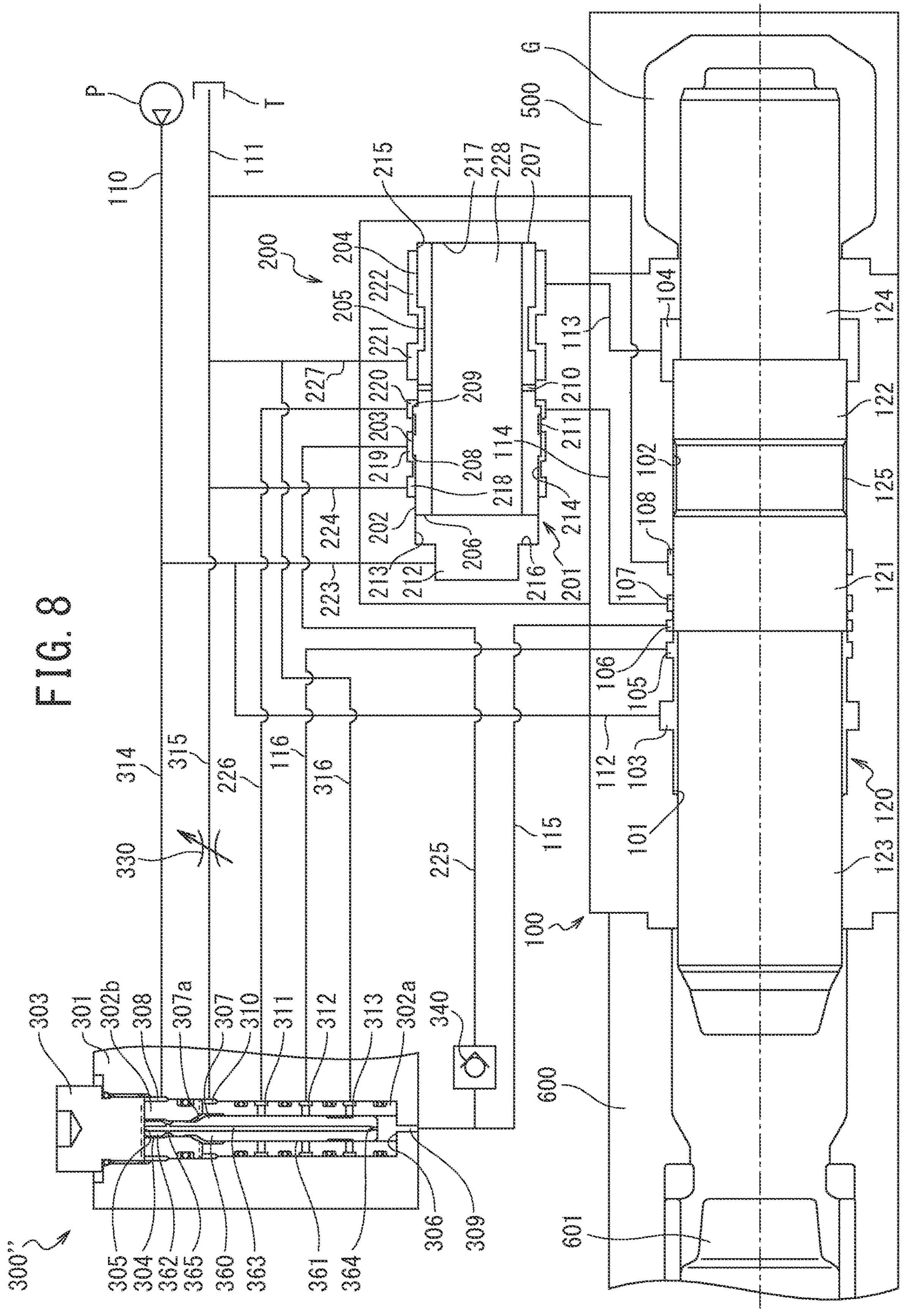
FIG. 8 is an explanatory diagram of operation when the spool is replaced with the spool for the idle strike prevention specification in the hydraulic hammering device of the second embodiment.

FIGS. 7 and 8 illustrate states in which an idle strike prevention spool 360 is slidably fitted into a second control valve 300".

As illustrated in FIGS. 7 and 8, the idle strike prevention spool 360 is a cylindrical member having a large-diameter portion 361 and a small-diameter portion 362, and, at the axis thereof, a through-hole 363 is formed along the axis. On the large-diameter portion 361 side of the through-hole 363, an orifice 364 is disposed, and, on the small-diameter portion 362 side of the through-hole 363, lateral holes 365 are formed in the direction intersecting the axis at right angles. The lateral holes 365 are formed in such a way as to come into communication with the decompression chamber 307 via a gap 307*a* when the idle strike prevention spool 360 moves to the lower end position. In the second embodiment, the idle strike prevention spool 360 differs from the shared spool 320 in the first embodiment in that the communication groove 323 in the first embodiment is not formed on the outer periphery of the large-diameter portion 361.

A configuration of the other portion of the second control valve 300" is the same as that of the second control valve 300 of the first embodiment. Note that, in the case of the second control valve 300", because there is no possibility that a valve communication port 311 and a cylinder communication port 312 come into communication with each other because the communication groove 323 in the first embodiment is not formed, a stroke control passage 116 and a valve control passage (via spool) 226 do not work as an auto-stroke mechanism.

In the second embodiment, replacement work of the auto-stroke spool 350 and the idle strike prevention spool 360 can be performed only by removing a plug 303 and a first sleeve 302*a*. Therefore, it is possible to change the auto-stroke specification into the idle strike prevention specification and vice versa appropriately and easily, on an as-needed basis.

The following is a list of reference numbers used in the drawing figures.

100 Cylinder
101 Piston front chamber
102 Piston rear chamber
103 Front chamber port
104 Rear chamber port
105 Stroke control port
106 Spool control port
107 Valve control port
108 Low pressure port
110 High pressure circuit
111 Low pressure circuit
112 Front chamber passage
113 Rear chamber passage
114 Valve control passage (direct connection)
115 Spool control passage
116 Stroke control passage
120 Piston
121 Front-side large-diameter portion
122 Rear-side large-diameter portion
123 Medium-diameter portion
124 Small-diameter portion
125 Annular groove
200 First control valve
201 Valve
202 Medium-diameter portion
203 Large-diameter portion
204 Small-diameter portion
205 Oil discharge groove
206 Front end surface
207 Rear end surface
208 Front-side stepped surface
209 Rear-side stepped surface
210 Communication hole
211 Slit groove
212 Valve chamber
213 Valve front chamber
214 Valve main chamber
215 Valve rear chamber
216 Valve chamber front end surface
217 Valve chamber rear end surface
218 Front-side low pressure port
219 Reset port
220 Valve control port
221 Rear-side low pressure port
222 Rear chamber port
223 Front chamber passage
224 Front-side low pressure passage
225 Reset passage
226 Valve control passage (via spool)
227 Rear-side low pressure passage
228 Hollow passage
300, 300', 300" Second control valve
301 Housing
302*a*, 302*b* First sleeve, Second sleeve
303 Plug
304 Spool chamber
305 High pressure chamber
306 Control chamber
307 Decompression chamber
307*a* Gap
308 High pressure port
309 Control port
310 Decompression port
311 Valve communication port
312 Cylinder communication port
313 Low pressure port
314 High pressure passage
315 Decompression passage
316 Low pressure passage
320 Shared spool
321 Large-diameter portion
322 Small-diameter portion
323 Communication groove
324 Through-hole
325 Orifice
326 Lateral hole
330 Variable throttle

340 Check valve
350 Auto-stroke spool
351 Large-diameter portion
352 Small-diameter portion
353 Communication groove
360 Idle strike prevention spool
361 Large-diameter portion
362 Small-diameter portion
363 Through-hole
364 Orifice
365 Lateral hole
400 Mode selection means
401 First switching valve
402 Throttle
403 Second switching valve
500 Back head
600 Front head
601 Rod
G Back head gas
P Pump
T Tank

What is claimed is:

1. A hydraulic hammering device, comprising:
a cylinder;
a piston slidably fitted into the cylinder in such a manner as to be capable of advancing and retracting;
a first control valve to control advancing and retracting movements of the piston;
an auto-stroke mode configured to switch a piston stroke of the piston between a regular stroke and a short stroke shorter than the regular stroke;
an idle strike prevention mode configured to decompress an inside of a circuit configured to hydraulically drive the piston to lower than a working pressure; and
a second control valve to select either mode of the auto-stroke mode and the idle strike prevention mode, wherein the second control valve has a high pressure port connected to a high pressure passage, a decompression port connected and cut off from a decompression passage, and a cylinder communication port connected and cut off from a stroke control passage, and wherein:
to the second control valve, a shared spool including an auto-stroke setting portion and an idle strike prevention setting portion at a same time is slidably fitted,
a mode selection means comprising:
a second switching valve configured to move so that pressurized oil is cut off and supplied to the auto-stroke setting portion and a first switching valve configured to move so that pressurized oil is discharged from the idle strike prevention setting portion is disposed, and
the mode selection means is configured in such a way that:
when the first switching valve and the second switching valve are in a regular position, the auto-stroke mode is selected by the second switching valve allowing pressurized oil to be supplied to the cylinder communication port constituting the auto-stroke setting portion, and by the first switching valve prohibiting pressurized oil from being discharged from the decompression port constituting the idle strike prevention setting portion, and
when the first switching valve and the second switching valve are in an upper position, the idle strike prevention mode is selected by the second switching valve prohibiting pressurized oil from being supplied to the cylinder communication port constituting the auto-stroke setting portion, and by the first switching valve allowing pressurized oil to be discharged from the decompression port constituting the idle strike prevention setting portion.

2. The hydraulic hammering device of claim 1, wherein the second control valve includes a high pressure chamber.

3. The hydraulic hammering device of claim 2, wherein the second control valve includes a control chamber.

4. The hydraulic hammering device of claim 3, wherein the high pressure chamber and the control chamber are spaced apart by the shared spool.

5. The hydraulic hammering device of claim 3, further comprising:
a decompression chamber connected to the decompression passage by the decompression port, wherein the decompression chamber is located between the high pressure chamber and the control chamber.

6. The hydraulic hammering device of claim 1, wherein the mode selection means, when in the regular position, permits a decompression chamber within the second control valve to be free of exerting a decompression action on the shared spool via the pressurized oil being released into the decompression passage.

7. The hydraulic hammering device of claim 1, wherein the mode selection means, when in the upper position, permits a decompression chamber within the second control valve to exert a decompression action on the shared spool by the pressurized oil being supplied into the decompression passage.

8. The hydraulic hammering device of claim 7, further comprising a variable throttle in communication with the decompression chamber that assists the decompression chamber in exerting the decompression action.

9. The hydraulic hammering device of claim 1, further comprising:
a stroke control port and a valve control port that are free of a connection to one another.

10. The hydraulic hammering device of claim 9, wherein the stroke control port is part of the cylinder.

11. The hydraulic hammering device of claim 9, wherein the valve control port is part of the first control valve.

* * * * *